(No Model.)

E. T. CALLAHAN.
DUMPING WAGON.

No. 427,153. Patented May 6, 1890.

Witnesses.
J. L. Black
William Donahoe

Inventor:
Edward T. Callahan
per Geo. W. Sues,
Attorney.

UNITED STATES PATENT OFFICE.

EDWARD T. CALLAHAN, OF OMAHA, NEBRASKA.

DUMPING-WAGON.

SPECIFICATION forming part of Letters Patent No. 427,153, dated May 6, 1890.

Application filed March 14, 1890. Serial No. 343,933. (No model.)

*To all whom it may concern:*

Be it known that I, EDWARD T. CALLAHAN, a citizen of the United States, residing at Omaha, in the county of Douglas and State of Nebraska, have invented certain new and useful Improvements in Dumping-Wagons; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to new and useful improvements in dumping-wagons.

The object of this invention is to provide a dumping-wagon that shall be simple of construction and easily operated; and in furtherance of this object the invention consists in the construction, combination, and arrangement of parts, as hereinafter more fully described, and finally pointed out in the claim.

Figure 1:
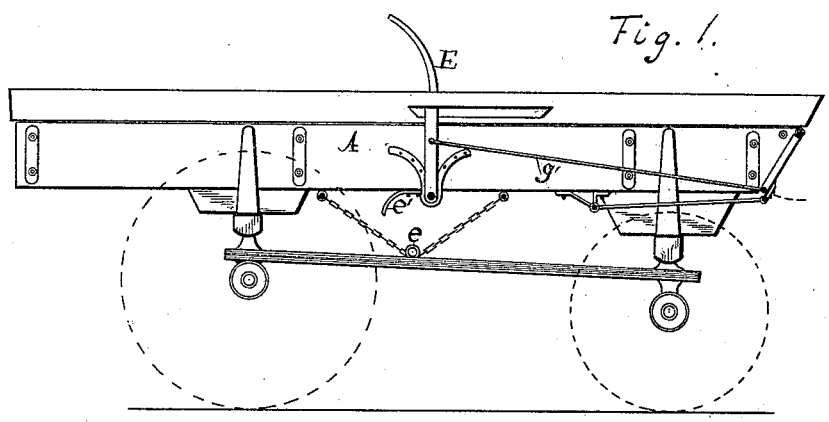
Figure 2:
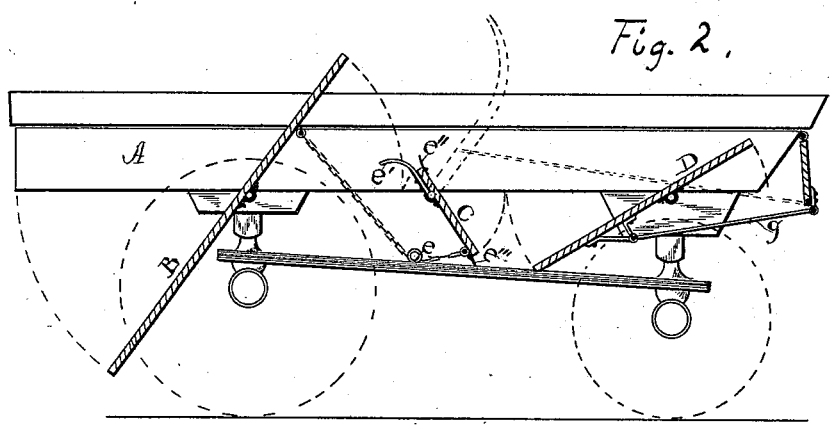

Figure 1 represents a side view of my dumping-wagon as locked when carrying a load, and Fig. 2 shows a longitudinal sectional view of my wagon as unlocked and the moment after the load has been dumped.

Similar letters of reference refer to corresponding parts throughout the drawings.

My improvement consists in constructing a wagon-box A, that may be mounted upon any suitable running-gear, which has its bottom or bed divided into three pivoted dumps, (marked B, C, and D.) Each dump is mounted upon a shaft pivotally connected to the side-boards of the wagon, as shown. The rear dump extends one-half the distance of the bed, and is mounted near its inner end upon a suitable metallic shaft, so that the rear end of the dump will be carried downward when the dump is in an unlocked position. The central section or dump is approximately one-sixth the length of the bed, and is hung so that it will dump forward, and in addition to the supporting-shaft is provided with an upwardly-extending operating-lever E, by means of which the dumps are locked and released. The forward section D is hung to dump backward, and is a little more than twice the length of the dump C. The dash-board at the forward end of the box is pivoted at its upper end, so as to form a fourth dump, which when unlocked is adapted to hang in a perpendicular position, as shown in Fig. 2.

The central dump C is adapted to be locked in a horizontal position by means of the lever E, which works within an opening of the projecting side-boards of the wagon, and is provided with a rack, within which the lever may be locked. Near the forward end upon the under side the dump C is provided with a ring, to which is attached a chain or cord working over a suitable pulley $e$, which is fastened to the reach of the wagon, the other end of said chain or cord being fastened to the forward under portion of the dump B, as clearly shown in Fig. 2. At the rear end the dump C is further provided with one or more downwardly-curved arms $e'$, upon which the forward portion of the dump B rests, while two or more short curved straps $e''$ clasp the dump B from above and hold it in a locked position when the lever E is fastened. The dump D is provided with a suitable bracket provided with an eye-bearing, to which is movably attached a rod $g$, the forward end of which is fastened to the lower free end of the dash-board, so that when said dash-board is in its closed position against the wagon-body the rod $g$ forces the dump D into a horizontal position, as shown in Fig. 1. A second rod $g'$ reaches from the lower end of the dash-board to the operating-lever E, and by this means the dash-board and the dump D connected thereto are locked and released.

The operation of my device is as follows: When the wagon has been loaded and it is desired to dump the contents, the lever E is released, which carries the central dump C downward, at the same time permitting the escape of the forward end of the rear dump B, which is shoved upward by the curved arm $e'$. The rod $g$, being connected to the lever E, is forced outward, and so carries the pivoted dash-board into a perpendicular position, and the board in turn draws down the rear portion of the dump D, as will be clearly understood by referring to Fig. 2. By means of the chain and the rods $g\ g'$ the dumps are held in a locked and horizontal position, as shown in the figures.

Having thus described my device and the best means of carrying the same into effect, what I claim, and desire to secure by United States Letters Patent, is—

In a dumping-wagon, the combination of a bed which is composed of two movable end sections and a pivoted dash-board, said end sections and dash-board being connected to and adapted to be operated by means of a pivoted central section, said central section being connected to said end sections and dash-board by means of connecting rods and chains, and adapted to be locked and released by means of a suitable lever, all arranged and adapted to work substantially as described.

In testimony whereof I affix my signature in presence of two witnesses.

EDWARD T. CALLAHAN.

Witnesses:
J. L. BLACK,
G. W. SUES.